United States Patent
Du et al.

(10) Patent No.: US 8,869,147 B2
(45) Date of Patent: Oct. 21, 2014

(54) MULTI-THREADED PROCESSOR WITH DEFERRED THREAD OUTPUT CONTROL

(75) Inventors: Yun Du, San Diego, CA (US); Guofang Jiao, San Diego, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1361 days.

(21) Appl. No.: 11/445,100

(22) Filed: May 31, 2006

(65) Prior Publication Data

US 2007/0283356 A1  Dec. 6, 2007

(51) Int. Cl.
*G06F 9/46* (2006.01)
*G06F 9/48* (2006.01)
*G06F 9/30* (2006.01)
*G06F 9/38* (2006.01)

(52) U.S. Cl.
CPC .......... *G06F 9/4881* (2013.01); *G06F 9/30123* (2013.01); *G06F 9/3851* (2013.01); *G06F 9/3857* (2013.01); *G06F 9/3836* (2013.01)
USPC ............................. 718/100; 718/101; 718/102

(58) Field of Classification Search
None
See application file for complete search history.

(56) References Cited

U.S. PATENT DOCUMENTS

| 3,469,244 | A | 9/1969 | Perotto |
|---|---|---|---|
| 4,079,452 | A | 3/1978 | Larson et al. |
| 4,361,868 | A | 11/1982 | Kaplinsky |
| 5,517,611 | A | 5/1996 | Deering |
| 5,590,326 | A | 12/1996 | Manabe |
| 5,598,546 | A | 1/1997 | Blomgren |
| 5,777,629 | A | 7/1998 | Baldwin |
| 5,793,385 | A | 8/1998 | Nale |
| 5,794,016 | A | 8/1998 | Kelleher |
| 5,798,770 | A | 8/1998 | Baldwin |
| 5,831,640 | A | 11/1998 | Wang et al. |
| 5,870,579 | A * | 2/1999 | Tan ............................. 712/217 |

(Continued)

FOREIGN PATENT DOCUMENTS

| EP | 0627682 A1 | 12/1994 |
|---|---|---|
| EP | 0676691 A2 | 10/1995 |

(Continued)

OTHER PUBLICATIONS

Akkary, H. and Driscoll, M. A. 1998. A dynamic multithreading processor. In Proceedings of the 31st Annual ACM/IEEE international Symposium on Microarchitecture (Dallas, Texas, United States). International Symposium on Microarchitecture. IEEE Computer Society Press, Los Alamitos, CA, 226-236.*

(Continued)

*Primary Examiner* — Emerson Puente
*Assistant Examiner* — Jonathan R Labud
(74) *Attorney, Agent, or Firm* — James R. Gambale, Jr.

(57) ABSTRACT

A multi-threaded processor is provided that internally reorders output threads thereby avoiding the need for an external output reorder buffer. The multi-threaded processor writes its thread results back to an internal memory buffer to guarantee that thread results are outputted in the same order in which the threads are received. A thread scheduler within the multi-threaded processor manages thread ordering control to avoid the need for an external reorder buffer. A compiler for the multi-threaded processor converts instructions that would normally send processed results directly to an external reorder buffer so that the processed thread results are instead sent to the internal memory buffer of the multi-threaded processor.

20 Claims, 5 Drawing Sheets

(56) References Cited

U.S. PATENT DOCUMENTS

| | | |
|---|---|---|
| 5,872,729 A | 2/1999 | Deolaliker |
| 5,913,059 A * | 6/1999 | Torii .................... 718/104 |
| 5,913,925 A * | 6/1999 | Kahle et al. .................. 712/206 |
| 5,944,816 A * | 8/1999 | Dutton et al. ................. 712/215 |
| 5,949,920 A | 9/1999 | Jordan et al. |
| 5,958,041 A | 9/1999 | Petolino, Jr. et al. |
| 5,991,865 A | 11/1999 | Longhenry et al. |
| 6,092,175 A | 7/2000 | Levy et al. |
| 6,163,839 A * | 12/2000 | Janik et al. .................. 712/219 |
| 6,188,411 B1 | 2/2001 | Lai |
| 6,219,769 B1 * | 4/2001 | Strongin et al. ............. 711/158 |
| 6,226,604 B1 | 5/2001 | Ehara et al. |
| 6,279,099 B1 | 8/2001 | Van Hook et al. |
| 6,466,221 B1 | 10/2002 | Satoh et al. |
| 6,480,941 B1 | 11/2002 | Franke et al. |
| RE37,944 E | 12/2002 | Fielder et al. |
| 6,493,741 B1 | 12/2002 | Emer et al. |
| 6,515,443 B2 | 2/2003 | Kelly et al. |
| 6,516,443 B1 | 2/2003 | Zook |
| 6,549,209 B1 | 4/2003 | Shinohara et al. |
| 6,570,570 B1 | 5/2003 | Suzuki et al. |
| 6,574,725 B1 * | 6/2003 | Kranich et al. ............... 712/31 |
| 6,577,762 B1 | 6/2003 | Seeger et al. |
| 6,593,932 B2 | 7/2003 | Porterfield |
| 6,614,847 B1 | 9/2003 | Das et al. |
| 6,636,214 B1 | 10/2003 | Leather et al. |
| 6,654,428 B1 | 11/2003 | Bose et al. |
| 6,693,719 B1 | 2/2004 | Gupta et al. |
| 6,697,063 B1 | 2/2004 | Zhu |
| 6,717,583 B2 | 4/2004 | Shimomura et al. |
| 6,734,861 B1 | 5/2004 | Van Dyke et al. |
| 6,744,433 B1 | 6/2004 | Bastos et al. |
| 6,792,575 B1 | 9/2004 | Samaniego et al. |
| 6,807,620 B1 | 10/2004 | Suzuoki et al. |
| 6,825,843 B2 | 11/2004 | Allen et al. |
| 6,891,533 B1 | 5/2005 | Alcorn et al. |
| 6,891,544 B2 | 5/2005 | Oka et al. |
| 6,950,927 B1 | 9/2005 | Apisdorf et al. |
| 6,952,213 B2 | 10/2005 | Ebihara |
| 6,952,440 B1 | 10/2005 | Underbrink |
| 6,958,718 B2 | 10/2005 | Symes et al. |
| 6,964,009 B2 | 11/2005 | Samaniego et al. |
| 6,972,769 B1 | 12/2005 | Nebeker et al. |
| 6,999,076 B2 | 2/2006 | Morein |
| 7,006,881 B1 | 2/2006 | Hoffberg et al. |
| 7,015,913 B1 * | 3/2006 | Lindholm et al. ............ 345/501 |
| 7,015,914 B1 | 3/2006 | Bastos et al. |
| 7,027,062 B2 | 4/2006 | Lindholm et al. |
| 7,027,540 B2 | 4/2006 | Wilson et al. |
| 7,030,878 B2 | 4/2006 | Xu et al. |
| 7,034,828 B1 | 4/2006 | Drebin et al. |
| 7,068,272 B1 | 6/2006 | Voorhies et al. |
| 7,088,371 B2 | 8/2006 | Lippincott |
| 7,098,922 B1 | 8/2006 | Bastos et al. |
| 7,130,443 B1 | 10/2006 | Werner et al. |
| 7,145,565 B2 | 12/2006 | Everitt et al. |
| 7,146,486 B1 | 12/2006 | Prokopenko et al. |
| 7,174,224 B2 | 2/2007 | Hudson et al. |
| 7,196,708 B2 | 3/2007 | Dorojevets et al. |
| 7,239,322 B2 | 7/2007 | LeFebvre et al. |
| 7,239,735 B2 | 7/2007 | Nozaki |
| 7,268,785 B1 | 9/2007 | Glanville et al. |
| 7,339,592 B2 | 3/2008 | Lindholm et al. |
| 7,358,502 B1 | 4/2008 | Appleby et al. |
| 7,372,484 B2 | 5/2008 | Mouli |
| 7,379,067 B2 | 5/2008 | Deering et al. |
| 7,388,588 B2 | 6/2008 | D'Amora et al. |
| 7,447,873 B1 | 11/2008 | Nordquist |
| 7,557,832 B2 | 7/2009 | Lindenstruth et al. |
| 7,574,042 B2 | 8/2009 | Tsuruoka et al. |
| 7,583,294 B2 | 9/2009 | Ray et al. |
| 7,612,803 B2 | 11/2009 | Meitav et al. |
| 7,619,775 B2 | 11/2009 | Kitamura et al. |
| 7,633,506 B1 | 12/2009 | Leather et al. |
| 7,673,281 B2 | 3/2010 | Yamanaka et al. |
| 7,683,962 B2 | 3/2010 | Border et al. |
| 7,684,079 B2 | 3/2010 | Takata et al. |
| 7,733,392 B2 | 6/2010 | Mouli |
| 7,738,699 B2 | 6/2010 | Tsuruoka et al. |
| 7,808,505 B2 | 10/2010 | Deering et al. |
| 7,813,822 B1 | 10/2010 | Hoffberg |
| 7,826,092 B2 | 11/2010 | Ejima et al. |
| 7,904,187 B2 | 3/2011 | Hoffberg et al. |
| 7,920,204 B2 | 4/2011 | Miyanari |
| 7,966,078 B2 | 6/2011 | Hoffberg et al. |
| 7,987,003 B2 | 7/2011 | Hoffberg et al. |
| 8,046,313 B2 | 10/2011 | Hoffberg et al. |
| 8,054,573 B2 | 11/2011 | Mathew et al. |
| 8,154,818 B2 | 4/2012 | Mathew et al. |
| 8,165,916 B2 | 4/2012 | Hoffberg et al. |
| 2002/0091915 A1* | 7/2002 | Parady .......................... 712/225 |
| 2003/0034975 A1 | 2/2003 | Lindholm et al. |
| 2003/0080959 A1 | 5/2003 | Morein |
| 2003/0105793 A1 | 6/2003 | Guttag et al. |
| 2003/0167379 A1 | 9/2003 | Soltis, Jr. |
| 2003/0172234 A1 | 9/2003 | Soltis, Jr. |
| 2004/0030845 A1 | 2/2004 | DeLano et al. |
| 2004/0119710 A1 | 6/2004 | Piazza et al. |
| 2004/0130552 A1 | 7/2004 | Duluk, Jr. et al. |
| 2004/0172631 A1 | 9/2004 | Howard |
| 2004/0187119 A1* | 9/2004 | Janik et al. .................... 718/100 |
| 2004/0246260 A1 | 12/2004 | Kim et al. |
| 2005/0090283 A1 | 4/2005 | Rodriquez |
| 2005/0184994 A1 | 8/2005 | Suzuoki et al. |
| 2005/0195198 A1 | 9/2005 | Anderson et al. |
| 2005/0206647 A1 | 9/2005 | Xu et al. |
| 2006/0004942 A1 | 1/2006 | Hetherington et al. |
| 2006/0020831 A1 | 1/2006 | Golla et al. |
| 2006/0028482 A1 | 2/2006 | Donovan et al. |
| 2006/0033735 A1 | 2/2006 | Seiler et al. |
| 2006/0066611 A1 | 3/2006 | Fujiwara et al. |
| 2006/0136919 A1* | 6/2006 | Aingaran et al. ............. 718/100 |
| 2007/0030280 A1* | 2/2007 | Paltashev et al. ............. 345/506 |
| 2007/0070075 A1 | 3/2007 | Hsu |
| 2007/0185953 A1 | 8/2007 | Prokopenko et al. |
| 2007/0236495 A1 | 10/2007 | Gruber et al. |
| 2007/0252843 A1 | 11/2007 | Yu et al. |
| 2007/0257905 A1 | 11/2007 | French et al. |
| 2007/0268289 A1 | 11/2007 | Yu et al. |
| 2007/0273698 A1 | 11/2007 | Du et al. |
| 2007/0292047 A1 | 12/2007 | Jiao et al. |
| 2007/0296729 A1 | 12/2007 | Du et al. |
| 2008/0074433 A1 | 3/2008 | Jiao et al. |

FOREIGN PATENT DOCUMENTS

| | | |
|---|---|---|
| EP | 0917056 A2 | 5/1999 |
| JP | 3185521 A | 8/1991 |
| JP | 9062852 A | 3/1997 |
| JP | 9231380 A | 9/1997 |
| JP | 2000057365 A | 2/2000 |
| JP | 2001222712 | 8/2001 |
| JP | 2001236221 A | 8/2001 |
| JP | 2001357410 A | 12/2001 |
| JP | 2002269583 | 9/2002 |
| JP | 2002529870 A | 9/2002 |
| JP | 2006099422 A | 4/2006 |
| RU | 2137186 C1 | 9/1999 |
| RU | 2004109122 | 6/2007 |
| TW | I230869 B | 4/2005 |
| WO | 0028482 A1 | 5/2000 |
| WO | WO0215000 A2 | 2/2002 |
| WO | WO2005086090 A2 | 9/2005 |

OTHER PUBLICATIONS

Kenji Watanabe, Wanming Chu, Yamin Li, "Exploiting Java Instruction/Thread Level Parallelism with Horizontal Multithreading," Australasian Computer Systems Architecture Conference, p. 122, 6th Australasian Computer Systems Architecture Conference (AustCSAC'01), 2001.*

Ying Chen, Resit Sendag, David J. Lilja, "Using Incorrect Speculation to Prefetch Data in a Concurrent Multithreaded Processor,"

(56) References Cited

OTHER PUBLICATIONS

Parallel and Distributed Processing Symposium, International, p. 76b, International Parallel and Distributed Processing Symposium (IPDPS'03), 2003.*

International Search Report, PCT/US07/070004—International Search Authority European Patent Office, Dec. 11, 2007.

Bjorke K: "High quality filtering" Chapter 24 in Book 'GPU Gems', [Online] 2004, XP002534488 Retrieved from the Internet: URL:http://http.developer.nvidia.com/GPUGems/gpugems_ch24.html> [retrieved on Jun. 29, 2009].

Blamer K et al.: "A Single Chip Multimedia Video Processor," Custom Integrated Circuits Conference, pp. 91-94, Proceedings of the IEEE (May 1994).

Segal, M. at al.: "The OpenGL Graphics System: A Specification." pp. 1-368, Version 2.0 (Oct. 22, 2004).

Waldspurger et al., Register Relocation: Flexible Contexts for Multithreading, International Symposium on Computer Architcture, Proceedings of the 20th Annual International Symposium on Computer Architecture, 1993.

Written Opinion, PCT/US07/070004—International Searching Authority—European Patent Office—Dec. 11, 2007.

Deering M et al: "The SAGE graphics architecture" Proceedings of the 29th Annual Conference on Computer Graphics and Interactive Techniques (SIGGRAPH'02), Jul. 23-26, 2002, San Antonio, Texas, USA, 2002, pp. 683-692, XP002534489.

Hadwiger M. et al: "Hardware-accelerated high-quality filtering on PC hardware" Proceedings of 2001 Conference on Vision, Modelling and Visualization, Nov. 21-23, 2001, Stuttgart, Germany, [Online] 2001, XP002534490 Retrieved from the Internet URL:http://wwwvis.informatik.uni-stuttgart.de/vmv01/dl/papers/8.pdf> [retrieved on Jun. 29, 2009].

Hopf MI et al: "Accelerating 3D convolution using graphics hardware" Visualization '99. Proceedings San Francisco, CA, USA Oct. 24-29, 1999, Piscataway, NJ, USA. IEEE, US, Oct. 29, 1999, pp. 471-564, XP031385575 ISBN: 978-0-7803-5897-3.

Novasad J: "Advanced high quality filtering" Chapter 27 in Book 'GPU-Gems 2', [Online]. 2005, XP002534486 Retrieved from the Internet:. URL:http://http.developer.nvidia.comiGPUGe ms2/gpugems2_chapter27.html> [retrieved on Jun. 29, 2009].

Owens J.D et al: "A survey of general-purpose computation on graphics hardware" Computer Graphics Forum, vol, 26, No. 1, Mar. 2007, pp. 80-113, XP002534491.

Sigg C. et al: "Fast third-order texture filtering" Chapter 20 in Book 'GPU Gems 2', 084 [Online] 2005, XP002534487 Retrieved from the Internet: URL:http://http.developer.nvidia.corn/GPUGe ms2/gpugems2_chapter20.html> [retrieved on Jun. 29, 2009].

Kilgariff et al.; "Chapter 30, The GeForce 6 Series GPU Architecture;" GPU Gems 2 Copyright 2005, pp. 471-491.

Lindholm et al.; "A User-Programmable Vertex Engine;" Aug. 17-21, 2001; ACM SIGGRAPH; pp. 149-158.

Wynn, Chris, "nVIDIA OpenGL Vertex Programming on Future-Generation GPUs;" May 8, 2004; Nvidia Corporation; pp. 1-97.

Sohn, et al., "A 155-mW 50-Mvertices/s Graphics Processor With Fixed-Point Programmable Vertex Shader for Mobile Applications," IEEE Journal of Solid-State Circuits, vol. 41, No. 5, May 2006, pp. 1081-1091.

Translation of Office Action in Japanese application 2009-511215 corresponding to U.S. Appl. No. 11/435,454, citing WO05086090, US20030080959 and JP2001222712 dated Feb. 22, 2011.

Hiroaki Hirata, and 4 others, "An elementary processor Architecture with Parallel Instruction Issuing from Multiple Threads," Information Processing Society article magazine, Information Processing Society of Japan, 1993, vol. 34, No. 4, pp. 595-605.

Onoue, M., et al., "3D Image Handbook", 1st ed., Asakura Publishing Co., Ltd. (Kunizou Asakura), Feb. 20, 2006, pp. 152-170.

* cited by examiner

US 8,869,147 B2

MULTI-THREADED PROCESSOR WITH DEFERRED THREAD OUTPUT CONTROL

REFERENCE TO CO-PENDING APPLICATIONS FOR PATENT

The present application is related to the following co-assigned U.S. patent applications, which are expressly incorporated by reference herein:

U.S. application Ser. No. 11/412,678, entitled "GRAPHICS SYSTEM WITH CONFIGURABLE CACHES", filed on Apr. 26, 2006;

U.S. application Ser. No. 11/441,696, entitled "GRAPHICS PROCESSOR WITH ARITHMETIC AND ELEMENTARY FUNCTION UNITS" filed on May 25, 2006.

BACKGROUND

1. Field

Various embodiments of the invention pertain to processor operation and architectures, and particularly to a multi-threaded processor that internally reorders output threads thereby avoiding the need for an external reorder buffer.

2. Background

Multi-threaded processors are designed to improve processing performance by efficiently executing multiple streams of encoded data (i.e., threads) at once within a single processor. Multiple storage registers are typically used to maintain the state of multiple threads at the same time. Multi-threaded architectures often provide more efficient utilization of various processor resources, and particularly the execution logic or arithmetic logic unit (ALU) within the processor. By feeding multiple threads to the ALU, clock cycles that would otherwise have been idle due to a stall or other delays in the processing of a particular thread may be utilized to service a different thread.

A conventional multi-threaded processor may receive multiple threads and processes each thread so as to maintain the same input thread order at the output stage. This means that the first thread received from a program is the first thread outputted to the program.

Programmable multi-threaded processors often include flow control capabilities. This permits programs to include flow control instructions sent to the programmable multi-threaded processor that may cause threads to be processed out of order. For example, a first input thread may not finish execution first, in some cases, it may finish execution last. However, programs expect to receive outputted threads in the order in which they were sent to the processor.

One approach to maintaining the order of a sequence of threads for a particular program or application is to add a large buffer to reorder the threads. This buffer is typically external to the multi-threaded processor core and requires additional logic to implement. Adding a large external buffer increases the cost of implementing a multi-threaded processor and also takes up much needed space.

Thus, a way is needed to reorder a sequence of threads for a particular program so that they are outputted by a multi-threaded processor in the same order as they are received without the need for an additional reorder buffer.

SUMMARY

A multi-threaded processor is provided having (a) a thread scheduler to track a sequence in which a plurality of threads are received from an application, (b) an internal memory buffer to temporarily store the plurality of received threads, and (c) a processing unit coupled to the thread scheduler and internal memory buffer. The processing unit is configured to (1) process the plurality of threads to obtain a plurality of corresponding results, and (2) store the plurality of results in the internal memory buffer. The plurality of threads are processed by the processing unit according to the order defined by flow control instructions associated with the plurality of threads. The flow control instructions may cause the plurality of threads to be processed in a different sequence than they were received. The thread scheduler causes the plurality of stored results to be outputted from the internal memory buffer according to the sequence in which the corresponding threads were received from the application. The memory buffer may include a plurality of input registers to store the plurality of received threads prior to processing and a plurality of output registers to store the plurality of results prior to being outputted. A load controller may be coupled to the thread scheduler and configured to store the plurality of threads in a plurality of input registers in the internal memory buffer under the direction of the thread scheduler. The load controller may also output the results from the internal memory buffer under the direction of the thread scheduler.

A method operational on a multi-thread processor compiler provides for (a) receiving a plurality of instructions to be compiled for operation on a multi-threaded processor; (b) identifying output instructions in the plurality of instructions that direct output results to an external register, (c) converting the identified output instructions to direct the output results to an internal register, and/or (d) compiling the plurality of instructions for processing by the multi-threaded processor. The multi-threaded processor may support flow control instructions that cause threads to be processed in a different order than they are received.

DETAILED DESCRIPTION

Figure 1:
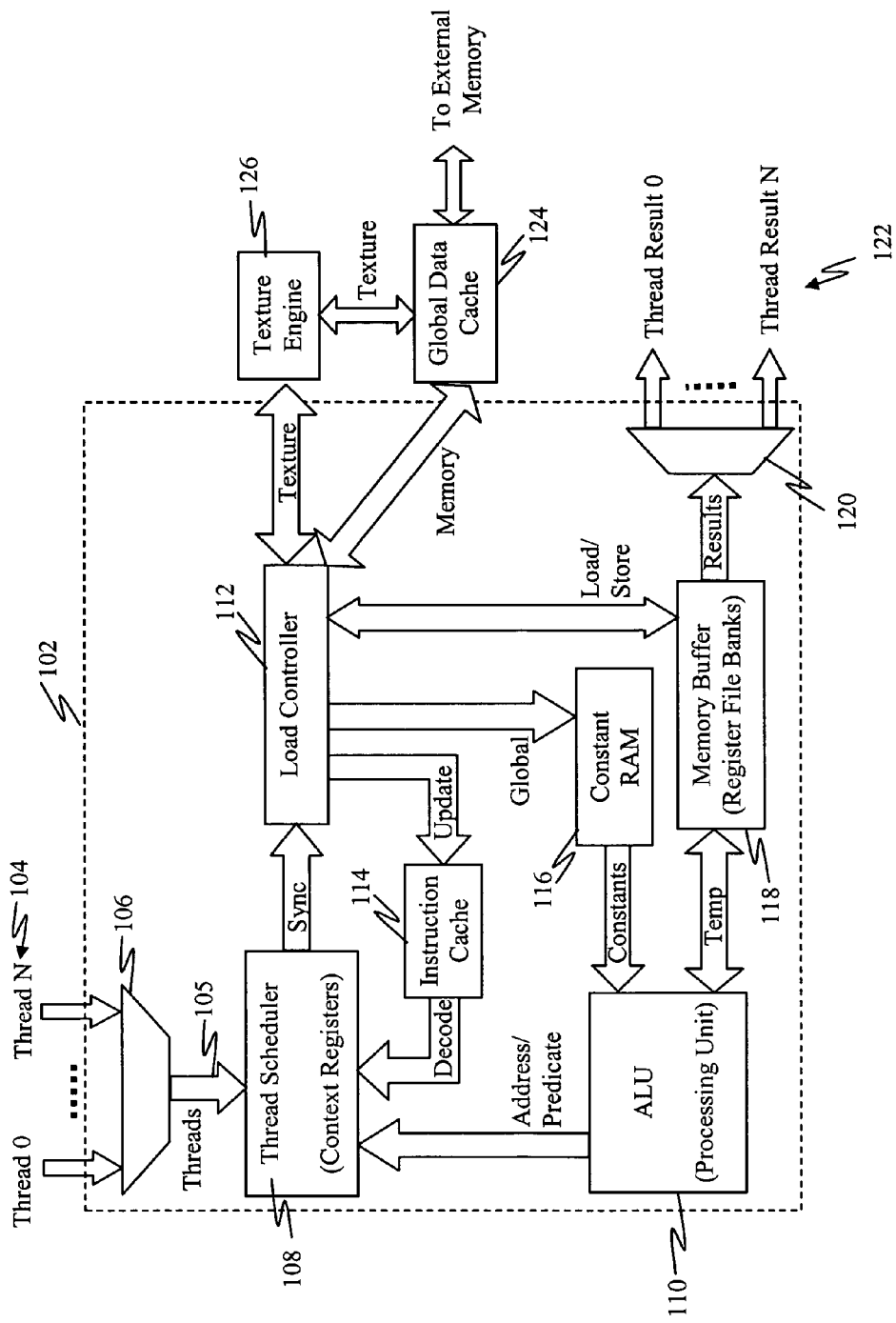
FIG. 1 is a block diagram illustrating a programmable multi-threaded processor that supports flow control instructions and is configured to output threads for a particular process in the same order in which they are received according to one embodiment.

In the following description, specific details are given to provide a thorough understanding of the embodiments. However, it will be understood by one of ordinary skill in the art that the embodiments may be practiced without these specific details. For example, circuits may not be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

One feature provides a multi-threaded processor configured to internally reorder output threads, thereby avoiding the need for an external output reorder buffer. The multi-threaded processor writes its thread results to a register bank in an internal memory buffer to guarantee that thread results are outputted in the same order in which the threads are received. A thread scheduler within the multi-threaded processor manages resource allocation, thread arbitration, and thread ordering to avoid the need for an external reorder buffer.

Another aspect of the invention provides a compiler for the multi-threaded processor that converts instructions that would normally send thread results directly to an external reorder buffer so that the thread results are instead sent to internal temporary registers in an internal memory buffer of the multi-threaded processor.

FIG. 1 is a block diagram illustrating a programmable multi-threaded processor 102 that supports flow control instructions and is configured to output threads (or segments or portions of thread results) for a particular process in the same order in which they are received according to one embodiment. The terms "core", "engine", "processor" and "processing unit" are used interchangeably herein. In one implementation, multi-threaded processor 102 may be a shader core that performs certain graphics operations such as shading and may compute transcendental elementary functions.

A plurality of threads 104 from one or more processes are received at an input interface (e.g., multiplexer 106) that multiplexes the threads 104 into a thread stream 105. Input threads 104 may include graphics data, such as pixel information, sent by one or more applications or processes. Such pixel information may include position coordinates, color attributes, and/or texture attributes for one or more pixels. Each application or process may have more than one thread. In some implementations, the threads for a particular application or process may have associated flow control instructions that cause the threads 104 to be processed in a different order than they were received from the application or process.

Thread scheduler 108 receives the thread stream 105 and performs various functions to schedule and manage execution of threads 104. For example, thread scheduler 108 may schedule processing of threads 104, determine whether resources needed by a particular thread are available, and move the thread to a memory buffer 118 (e.g., arranged as register file banks) via a load controller 112. Thread scheduler 108 interfaces with load controller 112 in order to synchronize the resources for received threads 104. Thread scheduler 108 may also monitor the order in which threads are received for a particular application or process and cause those threads to be outputted in the same order or sequence as they were received.

Thread scheduler 108 selects active threads for execution, checks for read/write port conflicts among the selected threads and, if there are no conflicts, sends instruction(s) for one thread into an ALU 110 and sends instruction(s) for another thread to load controller 112. At the request of thread scheduler 108, load controller 112 may also be configured to obtain data associated with a thread (from texture engine 126) and instructions associated with the thread from an external source (e.g., global data cache 124 and/or an external memory device, etc.). In addition to issuing fetch requests for missing instructions, load controller 1122 loads thread data into memory buffer 118 and associated instructions into instruction cache 114. Thread scheduler 108 also removes threads that have been processed by ALU 110.

ALU 110 may be a single quad ALU or four scalar ALUs. In one implementation, ALU 110 may perform pixel-parallel processing on one component of an attribute for up to four pixels. Alternatively, ALU 110 may perform component-parallel processing on up to four components of an attribute for a single pixel. ALU 110 fetches data from memory buffer 118 and receives constants from constant RAM 116. Ideally, ALU 110 processes data at every clock cycle so that it is not idle, thereby increasing processing efficiency. ALU 110 may include multiple read and write ports on a bus to memory buffer 118 so that it is able to write out thread results while new thread data is fetched/read on each clock cycle.

Multi-threaded processor 102 may be a programmable processor configured to efficiently process particular types of data (e.g., graphics data). For example, multi-threaded processor 102 may include constant data for efficiently processing multi-media data streams (e.g., video, audio, etc.). For this purpose, a constant RAM 116 may be included in the multi-threaded processor 102 to enable load controller 112, under the direction of thread scheduler 108, to load application-specific constant data to efficiently process particular types of instructions. For instance, an instruction cache 114 stores instructions for the threads to provide instructions to thread scheduler 108. Under the control of thread scheduler 108, load controller 112 loads instruction cache 114 with instructions from global data cache 124 and loads constant RAM 116 and memory buffer 118 with data from global data cache 124 and/or texture engine 126. The instructions indicate specific operations to be performed for each thread. Each operation may be an arithmetic operation, an elementary function, a memory access operation, etc.

Rather than writing out results to an external reorder buffer, ALU 110 uses memory buffer 118 to buffer its results before they are outputted by multi-threaded processor 102. To facilitate this dual use of memory buffer 118, the compiler for multi-threaded processor 102 may be configured to convert direct output register instructions to temporary register and use a global register to define which internal register in the memory buffer 118 should be used for writing results. That is, the compiler converts instructions that would normally send output from the ALU 110 to an external output register (i.e., an external reorder buffer) so that the outputs are instead sent to temporary registers (i.e., memory buffer 118). The compiler may accomplish this by either replacing direct output register instructions or by redirecting such output to temporary registers (i.e., in memory buffer 118). Global registers are used to indicate to ALU 110 which temporary registers (in memory buffer 118) are to be used to output results. In various implementations, the global registers that define the internal registers in memory buffer 118 (to be used to store outputs from ALU 110) may be either internal or external to multi-threaded processor 102.

Once results from ALU 110 are buffered in specified temporary registers in memory buffer 118, thread scheduler 108 directs their output sequence. That is, since thread scheduler 108 knows the order or sequence in which threads for a particular process were received, it directs load controller 112 to send out thread results in a specified sequence (i.e., the order in which the threads where originally received by thread scheduler 108). Since thread scheduler 108 knows which thread is being processed by ALU 110 at each clock cycle, it knows which registers in memory buffer 118 are used to store each ALU result. Thread scheduler 108 then directs load controller 112 to read-out buffered results from memory buffer 118 to an output interface (e.g., demultiplexer 120) so that the thread results 122 are sent to processes in the order or sequence in which the corresponding threads were received.

Figure 2:
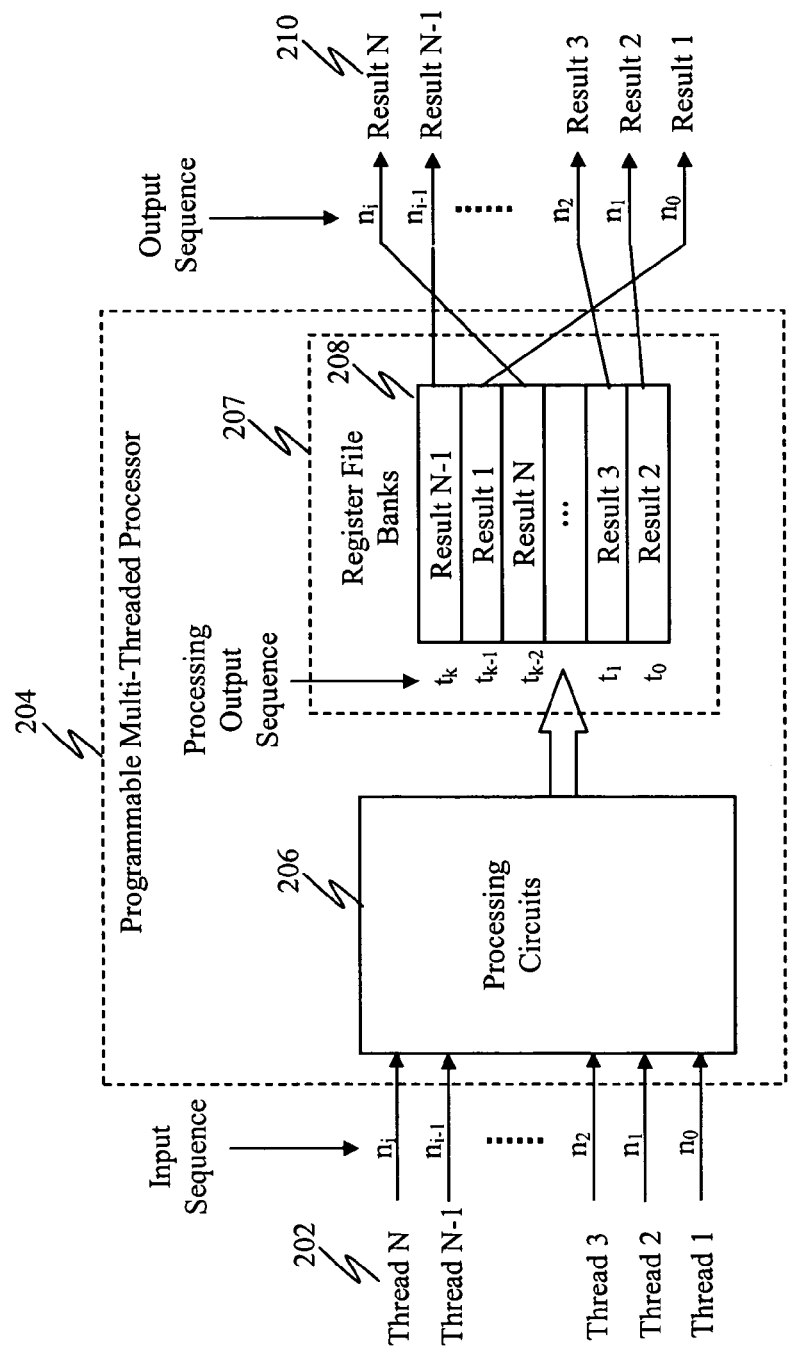
FIG. 2 is a block diagram illustrating how a sequence of threads may be buffered in internal temporary registers of a multi-threaded processor to guarantee that thread results are outputted in the same order the threads are received.

FIG. 2 is a block diagram illustrating how a sequence of threads may be buffered in internal temporary registers to guarantee that their results are outputted in the same order they are received a multi-threaded processor 204 according to one implementation. A plurality of threads 202 from a process or application are received by the multi-threaded processor 204 in the input order from Thread 1, Thread 2, Thread 3, etc., to Thread N−1 and Thread N. Multi-threaded processor 204 may be configured to support flow control instructions that may cause the received threads 202 to be processed out of sequence by processing circuits 206 within multi-threaded processor 204.

Rather than outputting processing results to an external reorder buffer, the present invention sends or redirects the thread results (Results 1 through N) to temporary registers in an internal memory buffer 207. The memory buffer 207 may store threads that are fetched by the processing circuits as well as the thread results of the processed threads. Memory buffer 207 may also include a plurality of register file banks 208 in which thread results are stored. Multi-threaded processor 204 may map virtual registers to available registers 208 in internal memory buffer 207 so that thread results can be stored in contiguous and/or non-contiguous memory addresses. Dynamic sizing of the internal registers allows flexible allocation of internal memory buffer 207 depending on the type and size of data in a thread.

Redirecting thread results to temporary registers in internal memory buffer 207 may be accomplished by having the multi-threaded processor compiler convert instructions that would normally send output results to an external output register (i.e., an external reorder buffer) so that the results from processing circuits 206 are instead sent to temporary registers in internal register file banks 208. By using internal register file banks 208 for buffering and reordering output results, an external reorder buffer is not needed thus saving costs and power.

As a result of flow control instructions, Threads 1 through N may be processed out of order, generating the processing output sequence of Result 2 (corresponding to Thread 2), Result 3 (corresponding to Thread 3), etc., Result N (corresponding to Thread N), Result 1 (corresponding to Thread 1), Result N−1 (corresponding to Thread N−1), for example. These results are held/stored in temporary registers in register file banks 208 in memory buffer 207. The processing results are buffered until Results 1 through N 210 can be outputted in the order in which their corresponding threads 202 were received.

Figure 3:
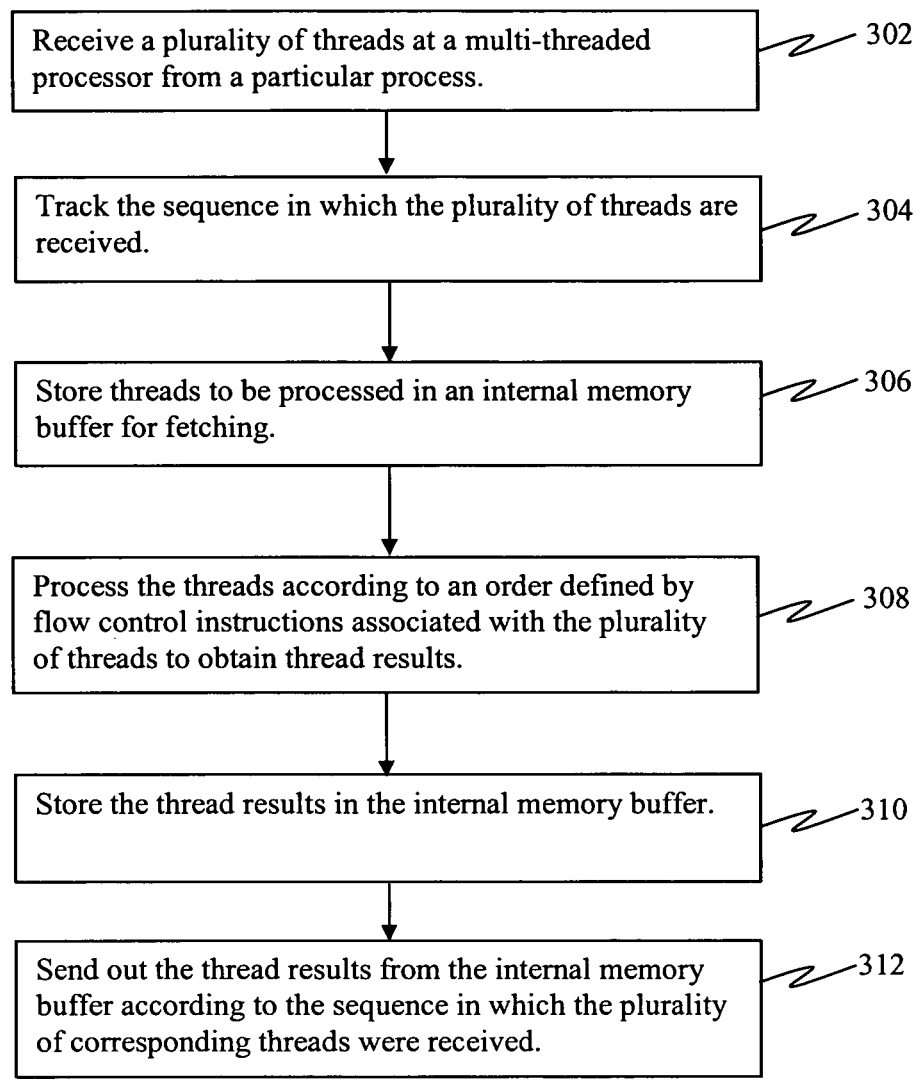
FIG. 3 is a flow diagram illustrating a method operational on a multi-threaded processor to guarantee that threads for a particular process are outputted in the same order in which they were received according to one implementation.

FIG. 3 is a flow diagram illustrating a method operational on a multi-threaded processor to guarantee that threads are outputted in the same order in which they were received by the multi-threaded processor according to one implementation. A plurality of threads are received at a multi-threaded processor 302 from a particular process. A thread scheduler tracks the sequence in which the plurality of threads is received 304. The threads to be processed are stored in an internal memory buffer for fetching 306. The threads are processed according to an order defined by flow control instructions associated with the plurality of threads to obtain thread results 308. The thread results are stored in the internal memory buffer 310. The thread results are sent out from the internal memory buffer according to the sequence in which the plurality of corresponding threads were received 312. In one implementation, the thread order control described by this method may be performed or managed by a thread scheduler in the multi-threaded processor. Because the input and output stages of the multi-threaded processor are decoupled, it s relatively simple to implement this type of thread ordering control.

Figure 4:
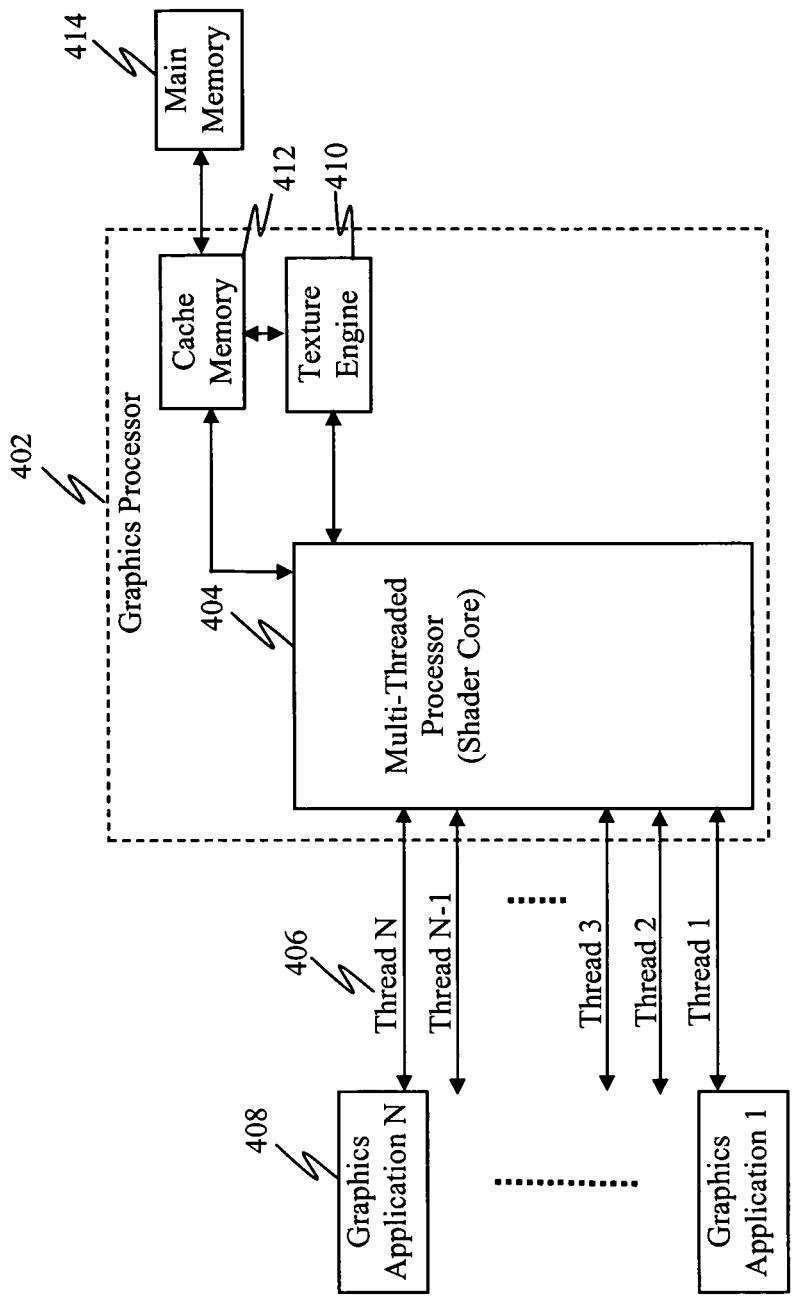
FIG. 4 is a block diagram of a graphics processor that includes a multi-threaded processor according to one embodiment of the invention.

FIG. 4 is a block diagram of a graphics processor 402 that includes a multi-threaded processor according to one embodiment of the invention. Graphics processor 402 includes a multi-threaded processor 404, such as a shader core, that receives a plurality of threads 406 from one or more graphics applications 408 as inputs, either serially or in parallel, processes graphic data in the threads 406 (e.g., pixel coordinates, colors, texture, etc.), and provides the thread results 408 as outputs to the graphic applications 408. Graphics applications 408 may include video games, graphic displays, etc., and may run concurrently. Each graphics application 408 may generate data threads to achieve their desired results. Each thread may have associated instructions that indicate a specific task to be performed on one or more pixels in the thread.

In one implementation, graphics processor 402 also includes supporting components, such as a texture engine 410 that performs specific graphic operations such as texture mapping, and a cache memory 412 that is a fast memory that can store data and instructions for multi-threaded processor 404 and texture engine 410. Cache memory 412 may be coupled to an external main memory 414 through which it can receive data and/or instructions for particular threads.

Multi-threaded processor 404 may include an internal memory buffer which is used for temporarily storing threads 406 and/or thread result. For a given process or application, a thread scheduler in the multi-threaded processor causes the thread results to be output in the same order or sequence in which the corresponding threads were originally received.

Graphics processor 402 and/or multi-threaded processor 404 (e.g., shader core) may be implemented in various hardware units, such as application-specific integrated circuits (ASICs), digital signal processors (DSPs), digital signal processing device (DSPDs), programmable logic devices (PLDs), field programmable gate array (FPGAs), processors, controllers, micro-controllers, microprocessors, and other electronic units.

Certain portions of graphics processor 402 and/or multi-threaded processor 404 may be implemented in firmware and/or software. For example, a thread scheduler and/or a load control unit (e.g., in multi-threaded processor 404) may be implemented with firmware and/or software code (e.g., procedures, functions, and so on) that perform the functions described herein. The firmware and/or software codes may be stored in a memory (e.g., cache memory 412 or main memory 414) and executed by multi-threaded processor 404.

Figure 5:
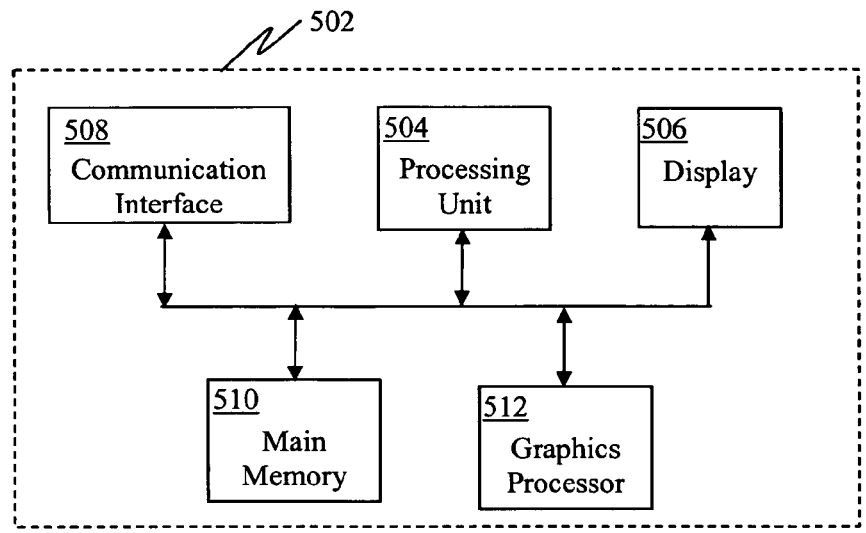
FIG. 5 is a block diagram illustrating a mobile device having a graphics processor with a multi-threaded processor configured to operate according to one implementation of the present invention.

FIG. 5 is a block diagram illustrating a mobile device 502 having a graphics processor 512 with a multi-threaded processor configured to operate according to one implementation of the present invention. Mobile device 502 may be a mobile telephone, personal digital assistant, mobile video terminal, etc. A processing unit 504 is communicatively coupled to a main memory 510 and a display 506 that provides graphics, video, and other information to a user. A communication interface 508 serves to communicatively couple mobile device 502 to other communication devices via a wireless or wired medium. A graphics processor 512 may be used by processing unit 504 to process graphics data prior to sending it to the display 506. Graphics processor 512 includes a multi-threaded processor configured to operate as illustrated in FIGS. 1, 2, 3 and/or 4. For instance, graphics processor 512 may include a multi-threaded processor having an internal memory buffer (e.g., register file banks) which temporarily stores thread results. For a given process or application, a thread scheduler in the multi-threaded processor causes the thread results to be output in the same order or sequence in which the corresponding threads were originally received.

Figure 6:
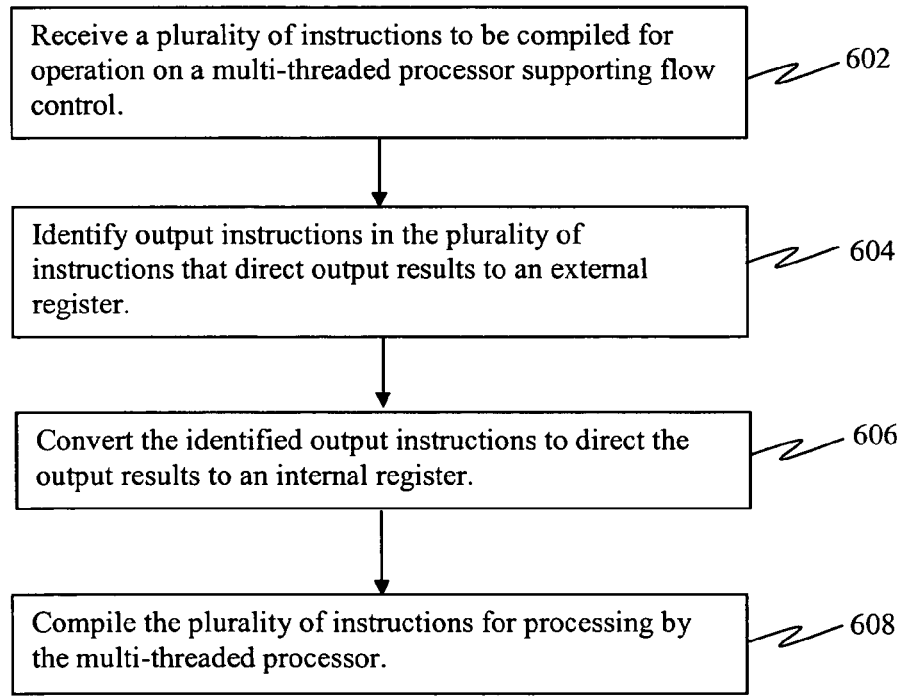
FIG. 6 illustrates a method operational in a code compiler for a multi-threaded processor having flow control instructions according to one embodiment.

FIG. 6 illustrates a method operational in a code compiler for a multi-threaded processor having flow control instructions according to one embodiment. The code compiler may be a low-level compiler that compiles instructions to be executed specifically by the multi-threaded processor. A plurality of instructions to be compiled for operation on the multi-threaded processor that supports flow control are received 602. Output instructions that direct output results to an external register are identified from among the plurality of instructions 604. The identified output instructions are converted to direct the output results to an internal register 606. This may be accomplished by replacing or converting the output instructions to instructions that redirect output to the internal register. The plurality of instructions is compiled for processing by the multi-threaded processor 608.

One or more of the components, steps, and/or functions illustrated in FIGS. 1, 2, 3, 4, 5 and/or 6 may be rearranged and/or combined into a single component, step, or function or embodied in several components, steps, or functions without departing from the invention. Additional elements, components, steps, and/or functions may also be added without departing from the invention. The apparatus, devices, and/or components illustrated in FIGS. 1, 2, 4 and/or 5 may be configured to perform one or more of the methods, features, or steps described in FIGS. 3 and/or 6.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A multi-threaded processor comprising:
   a thread scheduler configured to track a sequence in which a plurality of threads is received at an input interface of the multi-threaded processor;
   an internal memory buffer configured to temporarily store thread results corresponding to the plurality of received threads; and
   a processing unit coupled to the thread scheduler and the internal memory buffer, the processing unit configured to:
   process the plurality of threads out of sequence to obtain a plurality of corresponding thread results, and
   store the plurality of thread results in the internal memory buffer,
   wherein the thread scheduler is configured to cause the plurality of thread results stored in the internal memory buffer to be outputted from the multi-threaded processor in the sequence in which the corresponding threads were received by the multi-threaded processor.

2. The multi-threaded processor of claim 1 wherein the plurality of threads are processed by the processing unit according to the order defined by flow control instructions associated with the plurality of threads.

3. The multi-threaded processor of claim 2 wherein the flow control instructions are configured to cause the plurality of threads to be processed in a different sequence than they were received.

4. The multi-threaded processor of claim 1 wherein the internal memory buffer further includes:
   a plurality of input registers configured to store the plurality of received threads prior to processing and a plurality of output registers configured to store the plurality of thread results prior to being outputted.

5. The multi-threaded processor of claim 4 wherein the processing unit is further configured to retrieve a thread from one of the plurality of input registers in the memory buffer.

6. The multi-threaded processor of claim 1 further comprising:
   the input interface, wherein the input interface is coupled to the thread scheduler and configured to receive the plurality of threads; and
   an output interface coupled to the memory buffer from which the plurality of stored results are outputted, wherein the output interface comprises a demultiplexer.

7. The multi-threaded processor of claim 1 further comprising:
   a load controller coupled to the thread scheduler and configured to store the plurality of threads in a plurality of input registers in the internal memory buffer under the direction of the thread scheduler.

8. The multi-threaded processor of claim 7 wherein the load controller is configured to cause the results to be output from the internal memory buffer under the direction of the thread scheduler.

9. The multi-threaded processor of claim 1 wherein the received threads include pixel data and wherein the multi-threaded processor is configured to obtain data associated with a selected thread of the plurality of threads from a texture engine.

10. A multi-threaded processor comprising:
    means for tracking a sequence in which a plurality of threads is received at an input interface of the multi-threaded processor;
    means for processing the plurality of threads out of sequence to obtain a plurality of corresponding results;
    means for storing the plurality of results in an internal memory buffer; and
    means for causing the plurality of stored results to be outputted from the internal memory buffer in the sequence in which the corresponding threads were received by the multi-threaded processor.

11. The multi-threaded processor of claim 10 wherein the plurality of threads are processed according to the order defined by flow control instructions associated with the plurality of threads.

12. The multi-threaded processor of claim 10 further comprising:
    means for storing the plurality of threads in the internal memory buffer prior to processing.

13. A method for reordering the sequence of a plurality of thread results within a multi-threaded processor, comprising:
    tracking a sequence in which a plurality of threads is received by the multi-threaded processor;
    processing the plurality of threads out of sequence on a single core to obtain a plurality of corresponding results;
    storing the plurality of results in an internal memory buffer; and
    sending out the plurality of stored results stored in the internal memory buffer from the multi-threaded processor in the sequence in which the corresponding threads were received by the multi-threaded processor.

14. The method of claim 13 wherein the plurality of threads are processed according to the order defined by flow control instructions associated with the plurality of threads.

15. The method of claim 13 further comprising:
    receiving a plurality of threads for a particular process at a multi-threaded processor; and
    storing the plurality of threads in the memory buffer prior to processing.

16. A graphics processor comprising:
    a multi-threaded processor having a core, the core configured to:
        track a sequence in which a plurality of threads including pixel data is received from a first application;
        store the plurality of received threads in an internal memory buffer;
        process the plurality of threads in a different sequence than the sequence in which the plurality of threads were received according to an order defined by flow control instructions associated with the plurality of threads to obtain a plurality of corresponding results;
        store the plurality of results in the internal memory buffer; and
        output the plurality of results to the first application from the internal memory buffer in the sequence in which the corresponding threads were received from the application.

17. The graphics processor of claim 16 further comprising a texture engine in communication with the multi-threaded processor, wherein the core comprises a shader core configured to perform shading operations and obtain texture data associated with a selected thread of the plurality of threads from the texture engine.

18. A non-transitory computer-readable medium for use in reordering the sequence of a plurality thread results within a multi-threaded processor, the medium comprising instructions stored thereon to cause the multi-threaded processor to:
    track a sequence in which a plurality of threads is received by the multi-threaded processor;
    process the plurality of threads out of sequence on a single core to obtain a plurality of corresponding results;
    store the plurality of results in an internal memory buffer; and
    send out the plurality of stored results from the internal memory buffer in the sequence in which the corresponding threads were received by the multi-threaded processor.

19. The non-transitory computer-readable medium of claim 18, wherein the plurality of threads are processed according to an order defined by flow control instructions associated with the plurality of threads.

20. The non-transitory computer-readable medium of claim 18, further comprising instructions to cause a processor to:
    receive a plurality of threads for a particular process at an input interface of the multi-threaded processor; and
    store the plurality of threads in the internal memory buffer prior to processing.

* * * * *